US007070345B2

(12) United States Patent
Morimoto et al.

(10) Patent No.: US 7,070,345 B2
(45) Date of Patent: Jul. 4, 2006

(54) NARROWING THE OPERATING RANGE OF THE NOZZLE HEAD IN A PRINTING SYSTEM AND PRINTING METHOD

(75) Inventors: Shinji Morimoto, Wakayama (JP); Takahiko Tamura, Wakayama (JP)

(73) Assignee: Shima Seiki Manufacturing, Ltd., Wakayama (JP)

( * ) Notice: Subject to any disclaimer, the term of this patent is extended or adjusted under 35 U.S.C. 154(b) by 0 days.

(21) Appl. No.: 10/522,181

(22) PCT Filed: Jul. 22, 2003

(86) PCT No.: PCT/JP03/09293

§ 371 (c)(1), (2), (4) Date: Jan. 24, 2005

(87) PCT Pub. No.: WO2004/011261

PCT Pub. Date: Feb. 5, 2004

(65) Prior Publication Data

US 2005/0276646 A1 Dec. 15, 2005

(30) Foreign Application Priority Data

Jul. 25, 2002 (JP) ............................. 2002-216805

(51) Int. Cl.
*B41J 5/30* (2006.01)
*B41J 3/54* (2006.01)
*G06F 15/00* (2006.01)

(52) U.S. Cl. ......................... 400/62; 400/82; 358/1.12; 358/1.15

(58) Field of Classification Search .................. 400/62, 400/82, 61; 358/1.15, 1.12, 498, 475; 347/180; 382/100
See application file for complete search history.

(56) References Cited

FOREIGN PATENT DOCUMENTS

JP 2000-071582 A 3/2000
JP 2002-160412 A 6/2002

*Primary Examiner*—Andrew H. Hirshfeld
*Assistant Examiner*—Wasseem H. Hamdan
(74) *Attorney, Agent, or Firm*—Rothwell, Figg, Ernst & Manbeck, P.C.

(57) ABSTRACT

A printing system and a printing method, the printing method including the steps of horizontally placing cloth on a table, moving a nozzle head for ink jet printing in main and auxiliary scanning directions by a carriage for printing, extracting the presence area of printed data from print data, disassembling the presence area into a plurality of blocks, and controlling the carriage so that the nozzle head moves in the blocks for printing.

6 Claims, 8 Drawing Sheets

NARROWING THE OPERATING RANGE OF THE NOZZLE HEAD IN A PRINTING SYSTEM AND PRINTING METHOD

CROSS REFERENCE TO RELATED APPLICATION

This application is a 35 USC § 371 National Phase Entry Application from PCT/JP2003/009293, filed Jul. 22, 2003, and designating the U.S.

FIELD OF THE INVENTION

This invention relates to printing on cloth, a garment, paper, etc., and in particular, relates to printing efficiently by narrowing the operating range of the nozzle head.

BACKGROUND OF THE INVENTION

Printing in color with an ink jet printer is practiced on cloth, knitted fabric, etc. In such a case, to enhance commercial values, it is necessary to use a head that can print in full color, and a high resolution is also required. As a result, it takes a long time to print on cloth or the like, and the productivity is not necessarily high. To compete with, for example, the conventional textile printing or the like, the time required for printing with an ink jet printer must be shortened.

SUMMARY OF THE INVENTION

An object of the present invention is to achieve efficient printing by narrowing the operating range of the nozzle head of a printing system.

Another object of the present invention is to ease extraction of blocks.

Another object of the present invention is to ease extraction of blocks even if a range to be printed has a complex configuration with concave or protrusion.

Another object of the present invention is to shape blocks into forms that are easier for the nozzle head to be driven over.

Moreover, another object of the present invention is to reduce the amount of data processing required for extracting blocks.

The printing system of the present invention is a printing system comprising a table for placing a medium to be printed thereon, and a carriage for shifting a nozzle head for ink jet printing, in relation to said table, in both a main scanning direction and an auxiliary scanning direction within a printable range on said table, said printing system further comprising a block extracting means for extracting areas having data to be printed from print data inputted and freely separating said print data into blocks being narrower than the printable range in both the main scanning direction and the auxiliary scanning direction and a control means for controlling the carriage and the nozzle head so that the nozzle head scans within extracted blocks to print.

Preferably, said block extracting means comprises a boundary extracting means for extracting boundaries of areas having data to be printed from print data inputted at least in either the main scanning direction or the auxiliary scanning direction, and a setting means for setting blocks so that blocks include the extracted boundaries.

Preferably, said setting means is arranged to extract end points of extracted boundaries and points that are apart from said end points in a direction that differs from the direction of extracting boundaries by a specified distance or over, and to set blocks so that the blocks include said respective extracted points.

Preferably, said block is set as a rectangle of which each side is parallel to the main scanning direction or the auxiliary scanning direction.

Preferably, a preview image of print data is inputted into the block extracting means to extract blocks from said preview image.

The printing method of the present invention is a printing method using a printer comprising a table for placing a medium to be printed thereon and a carriage for shifting a nozzle head for ink jet printing, in relation to said table, in both a main scanning direction and an auxiliary scanning direction within a printable range, said printing method further comprising a step of extracting areas having data to be printed from print data inputted, and separating print data into blocks being narrower than the printable range in both the main scanning direction and the auxiliary scanning direction, and a step of controlling the carriage and the nozzle head so that the nozzle head scans within separated blocks to print.

In the printing system of the present invention, as blocks indicating areas to be printed are extracted from inputted print data, the scanning range of the nozzle head is limited within the blocks and printing can be done at high speed. When printing is to be made on a large medium such as cloth or a garment, the printing time is long, and hence it is particularly important to make printing more efficient.

Here, if boundaries of print data are extracted and blocks are set according to the boundaries, blocks can be extracted efficiently.

When end points are extracted from the extracted boundaries, and points that change in a direction differing from the direction of extracting boundary by a distance not smaller than a designated value are also extracted, respective vertices of blocks will be obtained. If boundaries have concave, protrusion or bend, these can be extracted as well. Hence it is easy to reshape blocks.

If the shape of a block is a rectangle of which each side is parallel to the auxiliary scanning direction or the main scanning direction, the driving range of the nozzle head will become a simpler form, and even when overprinting is done on the same line to print in full color, it will be easier to drive the nozzle head.

If a block is prepared not from the actual print data but from its preview image, the amount of processing for block extraction will be reduced, and even a large print data can be displayed on a monitor. Moreover, as the preview image is required for displaying the image to be printed, overheads of preparing the preview image will not be generated.

In the printing method of the present invention, as blocks indicating areas to be printed are extracted from the print data inputted, printing can be done at high speed by restricting the scanning range of the nozzle head within the blocks.

EMBODIMENT

Figure 1:
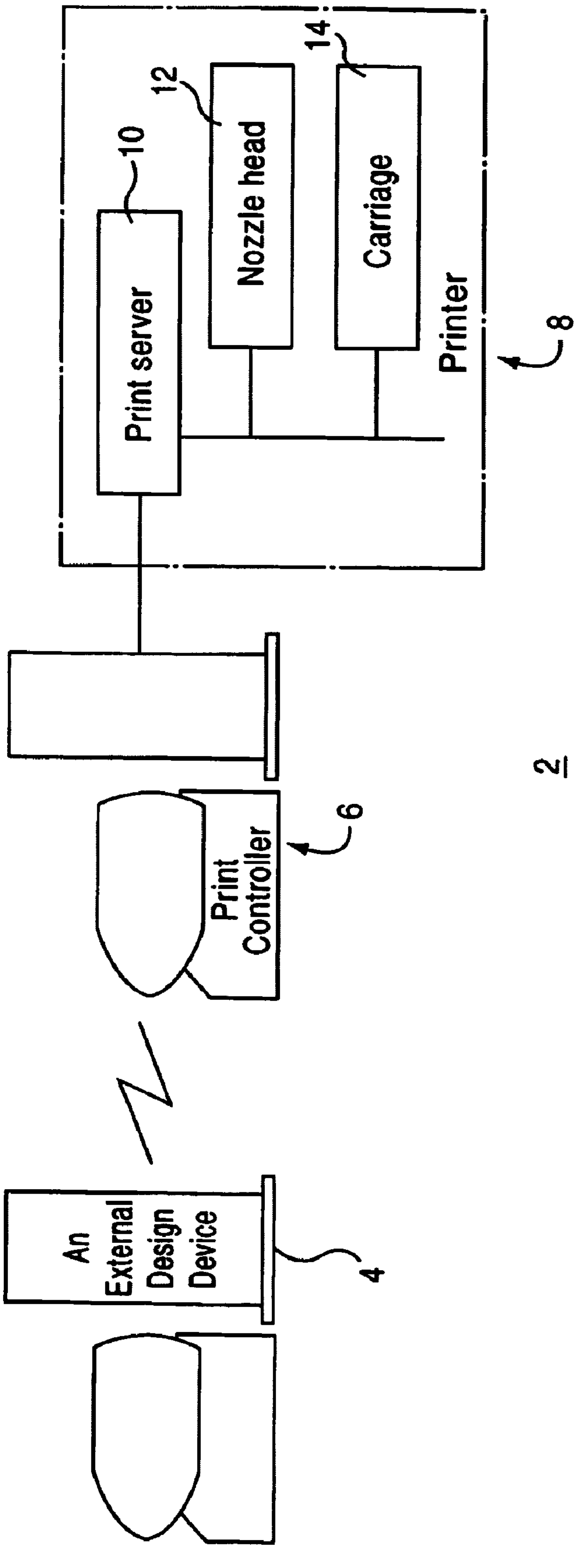
FIG. 1 is a block diagram of the printing system of an embodiment.

FIG. 1 through FIG. 10 illustrate the embodiment and its modification. FIG. 1 illustrates the structure of a printing system 2 of the embodiment, and 4 denotes an external designing device for inputting print data into a print controller 6 of the printing system 2 via, for example, a line or a disc. 8 denotes a printer into which print data is inputted from the print controller 6 and which is controlled by the print controller 6. 10 denotes a print server comprising a nozzle head 12 for ink jet printing and a carriage 14 for shifting the nozzle head 12 in both the X and Y directions independently of each other. In the embodiment, the X direction is the main scanning direction of the nozzle head, and the Y direction is the auxiliary scanning direction thereof. The designing device 4 inputs data to be printed on, for example, cloth or garments and a preview image of the data into the print controller 6. In this specification, the print data includes, in the broad sense, data of the preview image besides the data for actual printing. The preview image may be prepared by the print controller 6. The print controller 6 displays the preview image on its terminal to show the operator what image is to be printed by the printer 8 and ease setting of, for example, cloth or a knitted fabric or a woven fabric.

Figure 2:
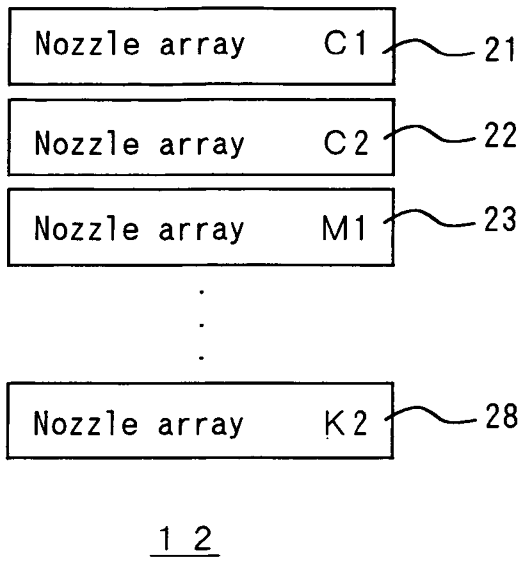
FIG. 2 is a diagram illustrating the structure of a head used in the embodiment.

FIG. 2 illustrates the structure of the nozzle head 12. The nozzle head 12 comprises, for example, eight nozzle arrays 21–28, and two arrays of these nozzle arrays are allotted to each of the colors of CMYK to achieve full color printing. For each color of CMYK, two kinds of inks, namely, a thick ink and a thin ink, are used, and 1 array is allotted to each of the thick ink and the thin ink. In the respective nozzle arrays 21–28, nozzles for ink jet printing are arranged, for example, in a row at a resolution of 60 dpi.

As for printing, printing is made in full color, for example, at 300 dpi. Let us assume that the longitudinal direction of the nozzle arrays 21–28 is the main scanning direction and a direction perpendicular to it is the auxiliary scanning direction. Then, if the nozzle arrays 21–28 of 60 dpi are used to print five times while shifting them by one fifth of the arrangement pitch of the nozzles in the main scanning direction each time, the resolution in the main scanning direction will be 300 dpi. Furthermore, for one line in the main scanning direction, the nozzle arrays are changed and overprinting is made eight times at the maximum to make full color printing. The resolution in the auxiliary scanning direction is, for example, 60 dpi, and the nozzle head 12 prints while it is shifted in the main scanning direction by one fifth (1/300 inch) of the nozzle arrangement pitch, and in the auxiliary scanning direction by 1/60 inch each time.

Figure 3:
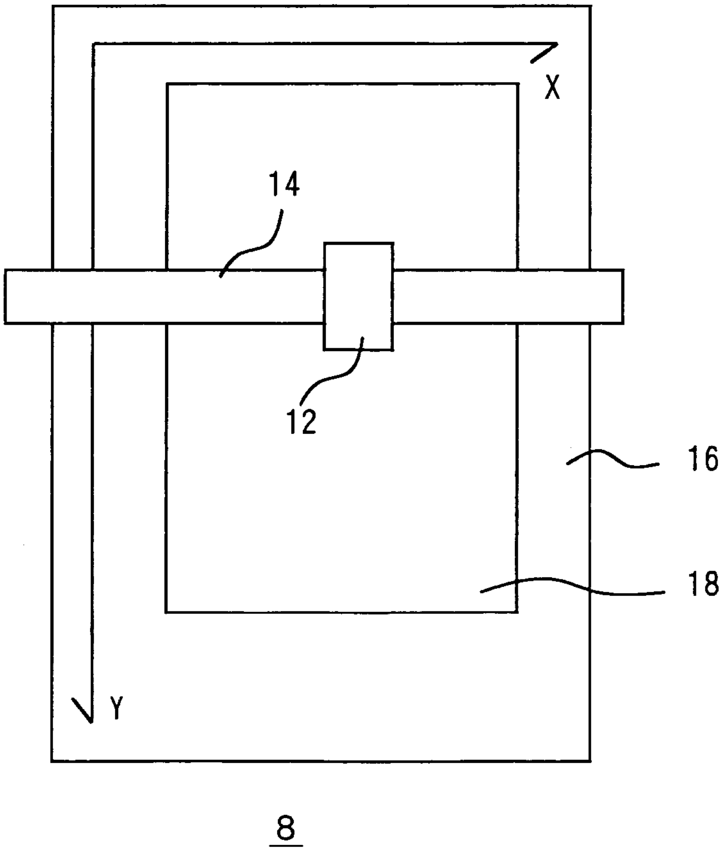
FIG. 3 is a plan view schematically illustrating a carriage and the head of the embodiment.

FIG. 3 illustrates the layout of the nozzle head 12 and the carriage 14 in the printer 8, and 16 denotes a print table of which top face is substantially horizontal, and a cloth 18 or the like is placed on it and ink is discharged from the nozzle head 12 to print. The carriage 14 can shift in relation to the print table 16 in the Y direction being the auxiliary scanning direction, and the nozzle head 12 can freely shift in relation to the carriage 14 in the main scanning direction (X direction). The carriage 14 and the nozzle head 12 shift at low speed inside blocks wherein printing is done and shift at high speed between blocks, and can return to the base position from any position and can shift from the base position to a printing start position of a block. The position for starting printing is not limited to the base position, and printing can be started at any discretionary position within the maximum operating strokes (printable range) of the nozzle head 12 and the carriage 14. Moreover, the operation of the nozzle head 12 in the main scanning direction and the operation of the carriage 14 in the auxiliary scanning direction are independent of each other.

To accomplish these functions, the carriage 14 operates along a guide rail or the like, which is provided on the print table 16 but not illustrated. Similarly, the nozzle head 12 operates along a guide rail or the like, which is provided on the carriage 14 but not illustrated. The carriage 14 and the nozzle head 12 are driven by, for example, toothed belt or a direct driven mechanism, and their current positions are detected continuously and they will be driven to their target positions by feed back mechanism.

In FIG. 3, an object to be printed is a cloth 18, but an object to be printed may be a knitted fabric or a woven cloth, or in the state of cloth or in the state of a garment. Preferably, the print table 16, the nozzle head 12 and the carriage 14 have a printable range of, for example, A0 or over so that printing can be made on cloth or a garment, and in turn, as the printable range is extensive, it is necessary to reduce the printing time.

Figure 4:
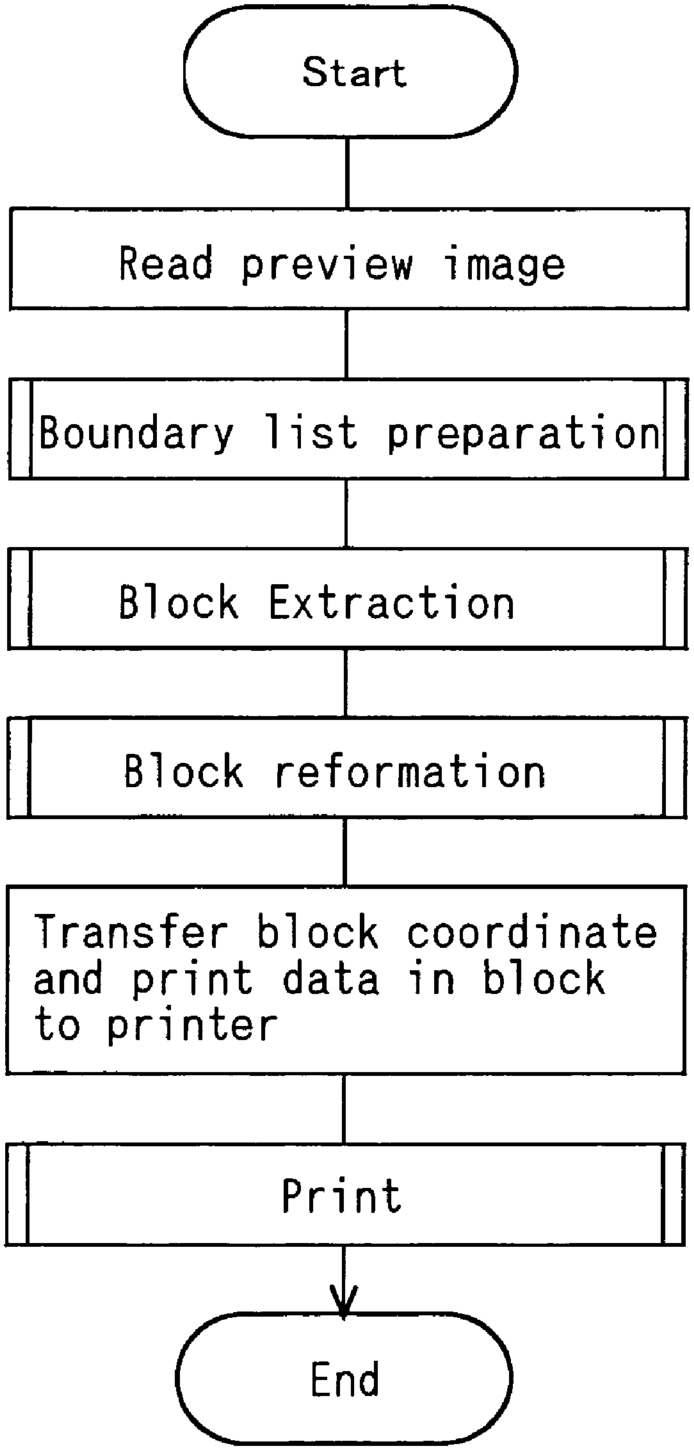
FIG. 4 is a flow chart illustrating a printing algorithm of the embodiment.

FIG. 4 illustrates a printing algorithm. The print controller reads a preview image, or lowers the resolution of the print data that is received from the designing device to prepare a preview image by itself. For example, in the embodiment, a preview image of 60 dpi×60 dpi is used for the print data of 300 dpi in the main scanning direction×60 dpi in the auxiliary scanning direction. Next, the preview image is scanned in either the main scanning direction or the auxiliary scanning direction to prepare lists of boundaries between the ground color area having no data to be printed and the area having print data. Blocks are extracted from the prepared boundary lists, and extracted blocks are reformed if necessary. Here, as each block is to be rectangular, each block is reformed into a rectangle. The coordinates of the block, for example, the coordinates of the respective vertices of the block, and the print data inside the block are transferred to the printer, and printing is executed.

Figure 5:
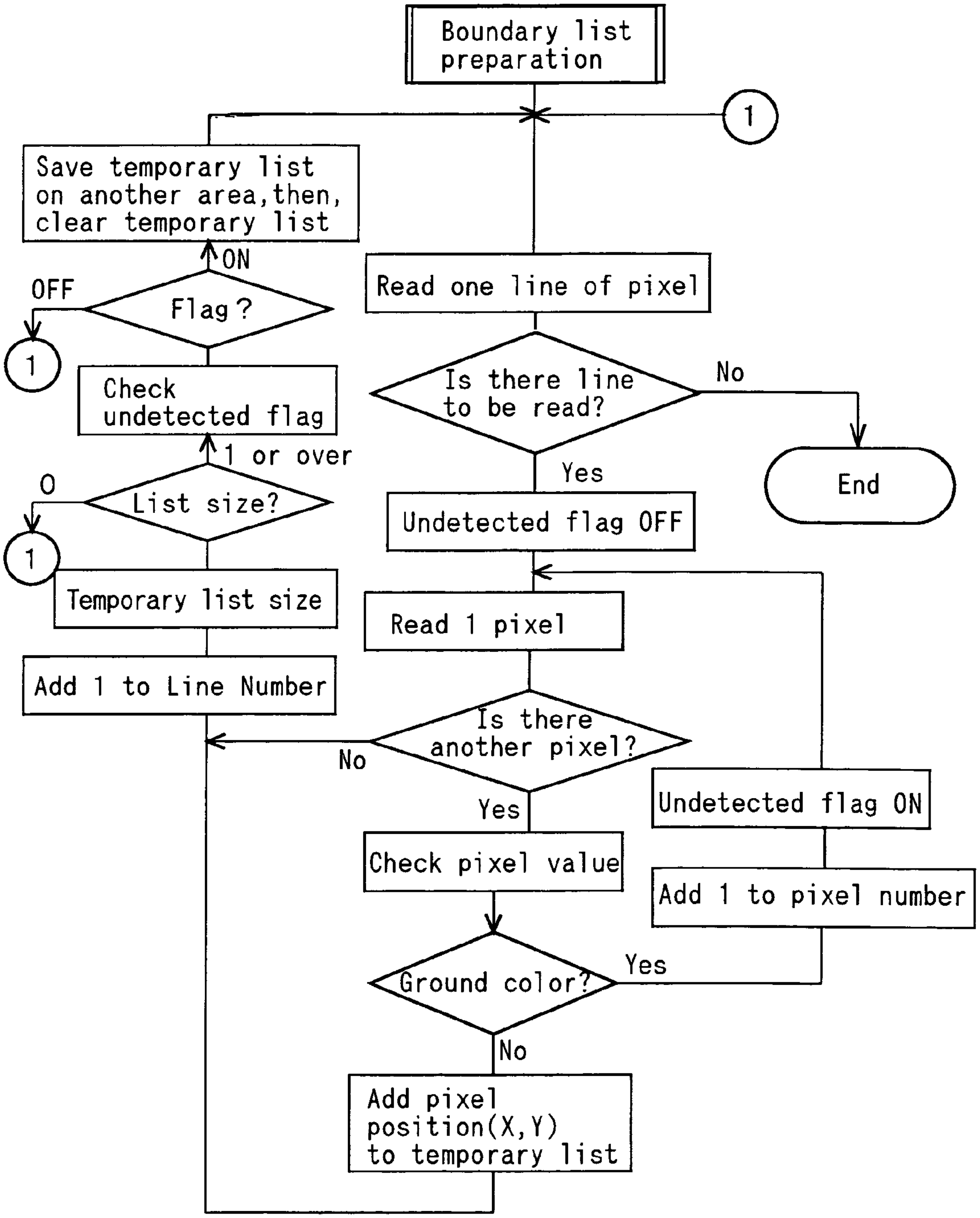
FIG. 5 is a flow chart illustrating a boundary list preparation algorithm of the embodiment.

FIG. 5 illustrates a boundary list preparation algorithm. A boundary list to be extracted is a list that shows how a boundary changes along the auxiliary scanning direction. However, in place of the auxiliary scanning direction, the main scanning direction may be used to prepare a list that shows how a boundary changes along the main scanning direction. For example, if a block to be extracted is a rectangle, the boundaries of the block should be of four kinds, namely, top, bottom, left and right. However, what is needed is two boundaries of top and bottom or two boundaries of left and right. There is no need of obtaining all the boundaries of four kinds.

In preparing a boundary list, pixels of one line are read out from the preview image, and if all lines have been read, the process will be terminated. If a line to be read is present, the undetected flag will be turned off, and a single pixel will be read, starting, for example, from the left end in the main scanning direction. If no pixel to be read is present, it means that the line has been processed already. Hence 1 is added to the line number so as to proceed the next line. If there exists a pixel to be read, the value of the pixel will be checked. If the pixel value is of the ground color, 1 will be added to the pixel number to turn on the undetected flag and read the next pixel. If there exists a pixel that is not of the ground color, its position will be added to the temporary list, and as the boundary has been found, 1 will be added to the line number to proceed the next line. The position of the boundary pixel may be stored in the form of the address of the pixel of the preview image. However, to make the processing at the time of printing easier, it is preferable that the position of the boundary pixel be stored in the form of coordinates in relation to an appropriate base position, for example, coordinates using a unit of length such as mm.

When processing of a single line is completed and 1 is added to the line number, the size of the temporary list for the line will be checked. If the list size is 0 and no pixel other than the ground color is detected, the step will jump to the connector ①. Next, the on/off of the undetected flag is checked. If the undetected flag is off and the pixel at the top end of the line is not of the ground color, the step will jump to the connector ①. If the temporary list has data of 1 or over, the undetected flag is on and the data to be printed starts from a position other than the top end of the line, the temporary list will be stored separately, to be more precise, the data will be added to the boundary list and the temporary list will be cleared. In this way, the step will proceed the next line, and the processing of FIG. 5 will be repeated until all the lines have been processed.

When the processing of FIG. 5 is started from the left end of a line in the main scanning direction, a list showing the boundary from the ground color to the region of which print data is present (boundary list) will be prepared on the left side of the line. Similarly to this, when a similar processing is done from the right end of the line in the main scanning direction, a boundary list showing the transition from the ground color to an area of which print data is present will be prepared on the right side of the line. Even if boundaries of areas having print data are obtained on both the left side and the right side of the line, there is a possibility that an area of ground color exists in the intermediate part between these boundaries.

Hence, between the above-mentioned left and right boundaries, search will be made for a boundary from an area having print data to a ground color part, and conversely, for a boundary from a ground color part to an area having print data. If there is no ground color part in the intermediate part between the left and right boundaries, the boundary next to the boundary on the left side of the line is the boundary to a ground color part from a region having print data on the right of the line. If a boundary is found in another position, search will be made for the next boundary, namely, a boundary from a ground color part to an area having print data. In this way, within the range from the left side to the right side of the line, boundary lists between a ground color part and an area having print data are extracted. In the embodiment, the left and right boundaries of the line were determined first, and then search was made to determine whether another boundary exists between these boundaries. In place of such an algorithm, boundaries may be determined sequentially from the left side or the right side of the line to the opposite side of the line.

The purpose of identifying a boundary between a ground color part and an area having print data is to restrict the operating range of the nozzle head, and in turn, to enhance the printing efficiency. Hence, even when a ground color part having no data to be printed is present in the intermediate part of the lines, if its width is not greater than a designated value, for example, not greater than 5 mm–10 cm, it is desirable to neglect such a narrow width part. As a result of the processing of FIG. 5, files of boundary lists between a ground color part and a part having print data are prepared in the auxiliary scanning direction.

Figure 6:
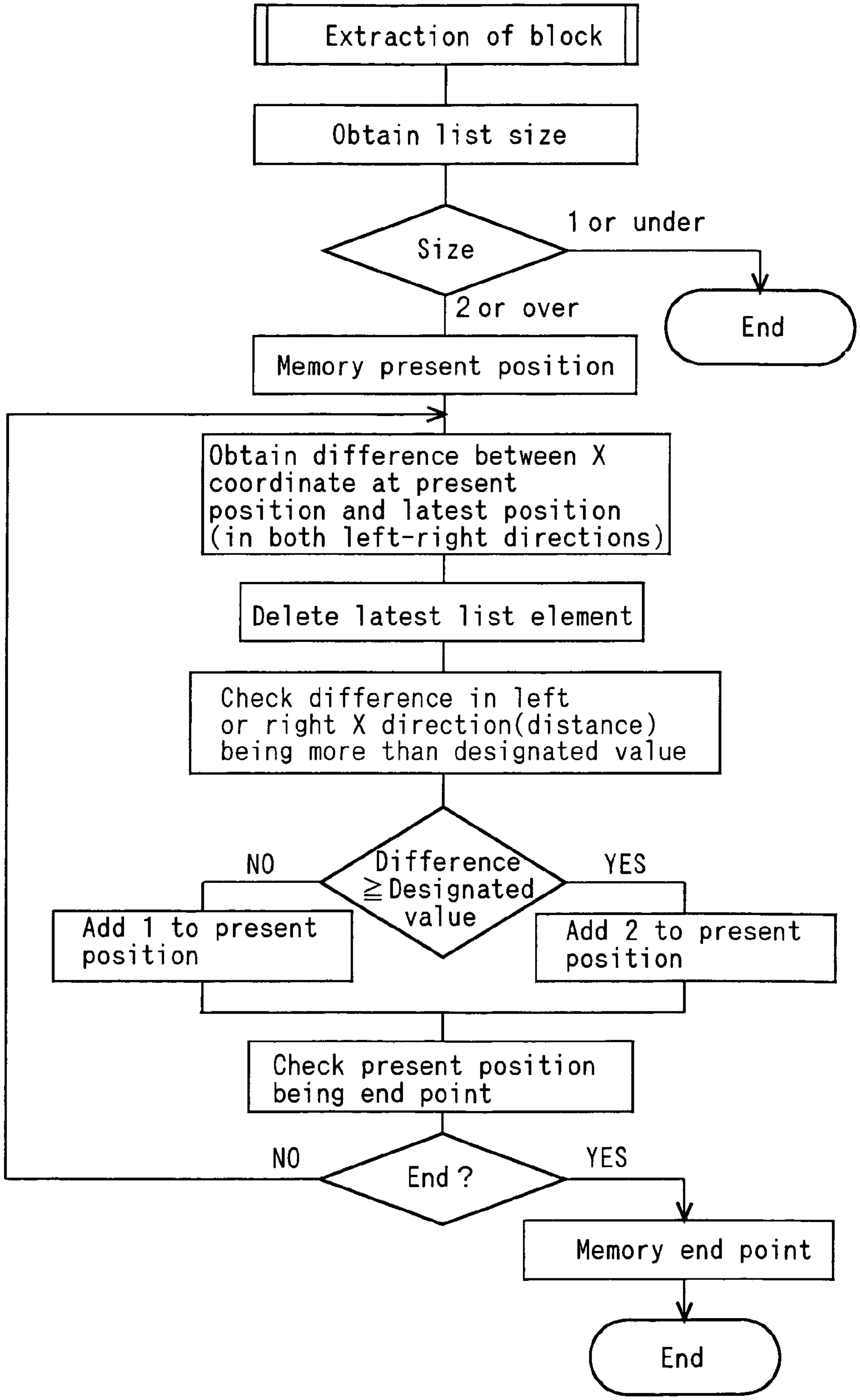
FIG. 6 is a flow chart illustrating a block extraction algorithm of the embodiment.

FIG. 6 illustrates an algorithm for extracting blocks from the boundary lists. The size of a boundary list is obtained, and if the size is not higher than 1, or the number of points that are listed as boundaries is not higher than one, the processing will be terminated. If the size of the list is 2 or over, the processing is to start from one end of the list, and the first position (start point) of the list will be stored. Next, the absolute value of the difference in the X coordinate between the present position on the list and the latest position on the list is obtained. Determining the absolute value without distinguishing positive and negative differences in the coordinates is expressed, in FIG. 6, as obtaining the difference in the X coordinate between the present position and the latest position in left-right direction. In the embodiment, as the boundary lists are assumed to be made along the auxiliary scanning direction, the difference in the coordinate in the main scanning direction between the present position and the latest position is obtained. However, if the boundary lists are parallel to the main scanning direction, the difference in the Y coordinate will be obtained.

After the difference in the coordinate is obtained, the latest element on the list will be deleted. If the absolute value of the difference in the coordinate is not lower than the designated value, 2 will be added to the list element to be processed next, namely, the present position. If the difference is less than the designated value, 1 will be added to the present position. Then it is checked whether the list was processed to its end. If the present position is the last list element, the coordinate of the last position (end point) will be stored. When this process is repeated to the end of the list, the positions of the start point and the end point of the list will be stored automatically. What are stored are coordinates in relation to an appropriate base position. In the middle of the list, if the difference in the coordinate between the latest position and the present position is small, the latest position will be deleted. If the difference in the coordinate is not less than the designated value, 2 will be added to the present position that is to be processed next, hence the list element of which difference in the coordinate is not less than the designated value is not subjected to deletion. As a result, when the processing is completed, the start point and the end point of the boundary list, and intermediate points of which changes in the coordinate in comparison with the latest position are not less than the designated value will be retained.

In this way, the start point and the end point of the boundary list and intermediate list points of which changes in the coordinate are large are extracted as feature points. The positions of these points are stored in the form of coordinates in relation to an appropriate base position, and preferably, an attribute of each point is stored. This attribute is whether it is a boundary from a ground color part to a part having data to be printed or a boundary from a part having data to be printed to a ground color part. As one preview image has a plurality of boundary lists, for example, on the right end side and on the left end side, the processing of FIG. 6 is given to each boundary list.

Figure 7:
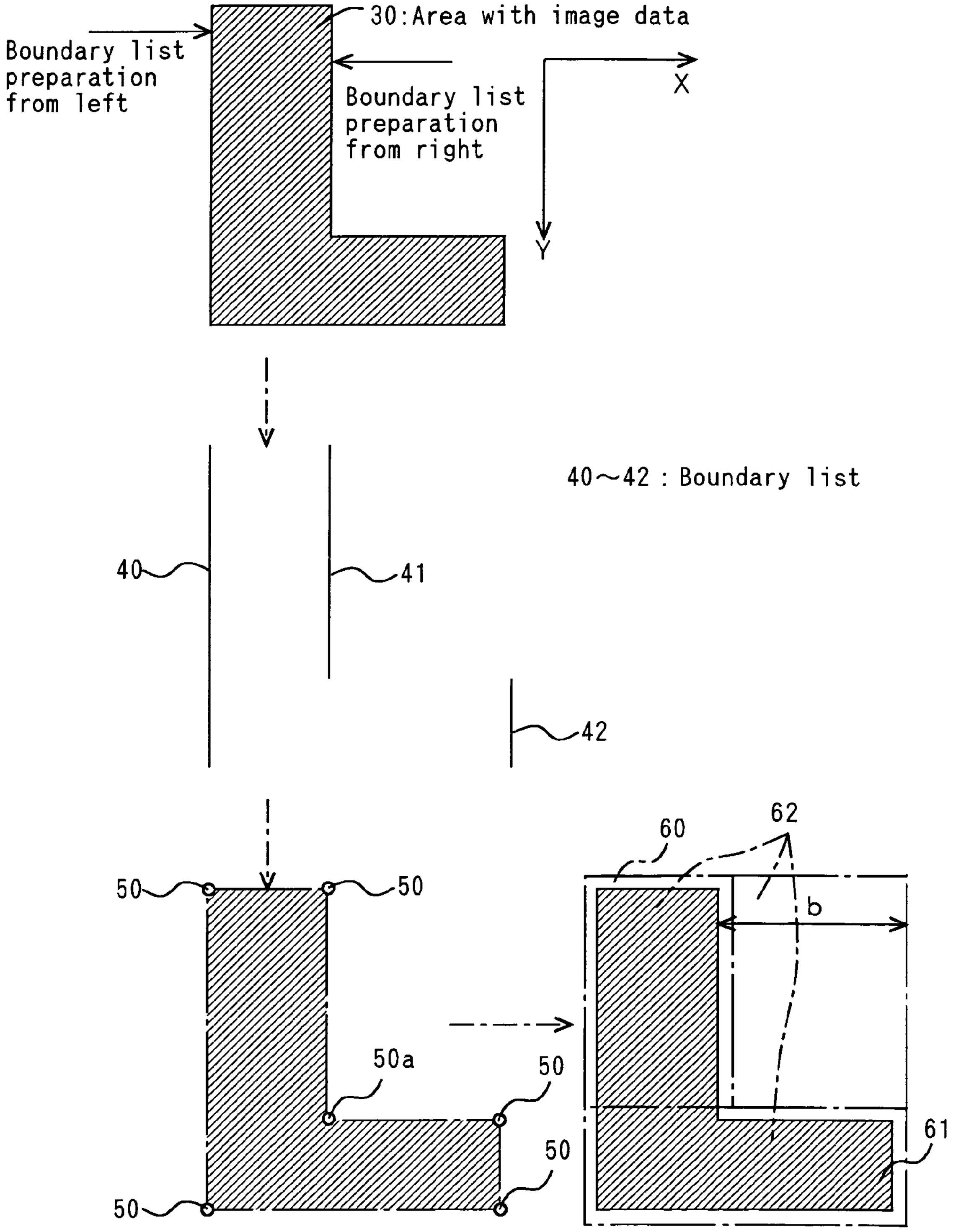
FIG. 7 is a diagram illustrating extraction of a block from print data in the embodiment.

FIG. 7 illustrates an example of the procedure from preparation of boundary lists to extraction of blocks. 30 denotes an area with image data, and its boundary lists are prepared from the left end side and the right end side, respectively, in the main scanning direction. In this way, for example, three boundary lists 40, 41, 42 are prepared. When the processing of FIG. 6 is given to the boundary lists 40 through 42, vertices 50 are obtained. If a polygon, which is formed by connecting these vertices, is considered as one block, this block has a bend at the position of the vertex 50*a*, and the block is divided here. Next, the divided blocks are reformed into, for example, rectangles to obtain blocks 60, 61. It should be noted that the respective blocks protrude from the polygon connecting the vertices outwards on the top, on the bottom, on the left and on the right. It is desirable to set this range of protrusion at a value substantially equal to the designated value of FIG. 6. The reason is that simple rectangular blocks rather than more complex forms of blocks allow easier driving of the nozzle head. Moreover, the protrusion from the polygon connecting the vertices by about the designated value ensures full coverage of the ranges of data to be printed within the protruded form.

As described above, the nozzle head prints in color by changing nozzle arrays for the same line in the main scanning direction. Because of this, if the configuration of a block is complex, the control will become complex. Moreover, even if a block shape is defined in detail, the efficiency of the movement of the nozzle head cannot be improved. The nozzle head can be shifted at high speed in an area having no data to be printed. However, if the shifting speed of the nozzle head is changed between a low speed shifting and a high speed shifting, overheads will be generated. Because of these reasons; it is desirable that blocks are defined in simple forms, and in particular, that blocks are defined in rectangles for which the shifting range of the nozzle head can be defined clearly. Moreover, it is desirable that, of this rectangle, two sides are parallel to the main scanning direction and the other two sides are parallel to the auxiliary scanning direction.

In FIG. 7, the blocks 60, 61 may be united together to form a larger rectangular block 62. This is applicable when the width b, which is the width b of the protrusion of the block 61 from the block 60, is small. In such a case, when the blocks 60 and 61 are united, the driving of the nozzle head will become more efficient. Hence the protrusion width b between two blocks is checked whether it is not higher than a designated value, and when the protrusion width is small, namely, when the printing time is shorter when the blocks are united, the blocks will be united.

Figure 8:
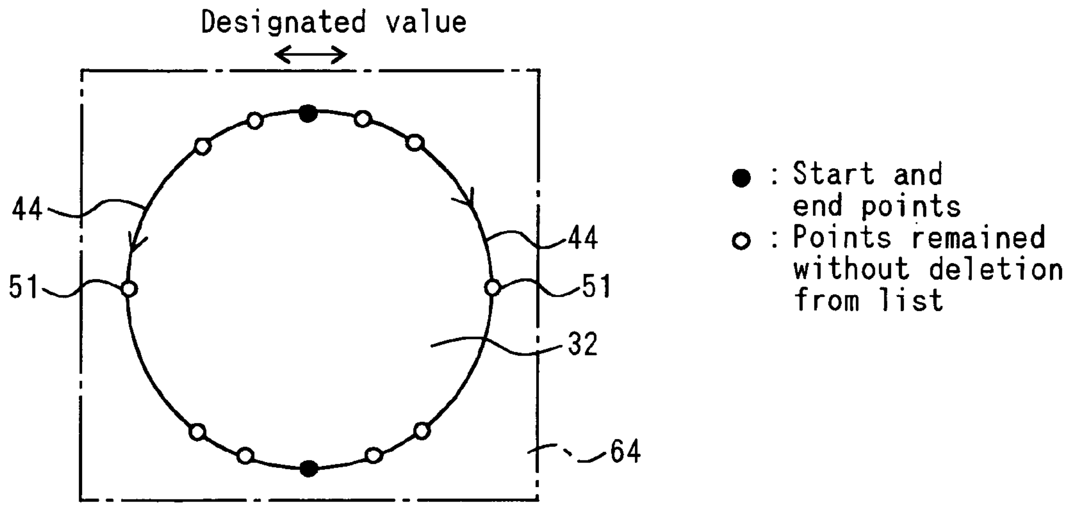
FIG. 8 is a diagram illustrating extraction of a block for an area enclosed by curves.

In FIG. 8, an area having image data 32 is assumed to be, for example, a circle. 44 denotes a boundary list. In this case, the boundary list 44 is prepared on both the right side and the left side of the circle, respectively. A starting point and a last point are extracted by the processing of FIG. 6. In the processing of FIG. 6, the absolute value of the difference in the coordinate between the present position and the latest position is obtained. Accordingly, when a step of eliminating an unnecessary element is repeated, a large difference in distance between the present position and the latest position will be generated around a point 51. Because of this, even when the boundary list undergoes smooth change rather than an abrupt bending as shown in FIG. 8, a feature point 51 will not be deleted but it will be extracted. If the block 64 is set in such a way that its protrusion from the polygon connecting the extracted points is substantially equal to the designated value of FIG. 6, as the difference in distance from the latest point is small, any point that is not extracted can be prevented from remaining outside the block.

Figure 9:
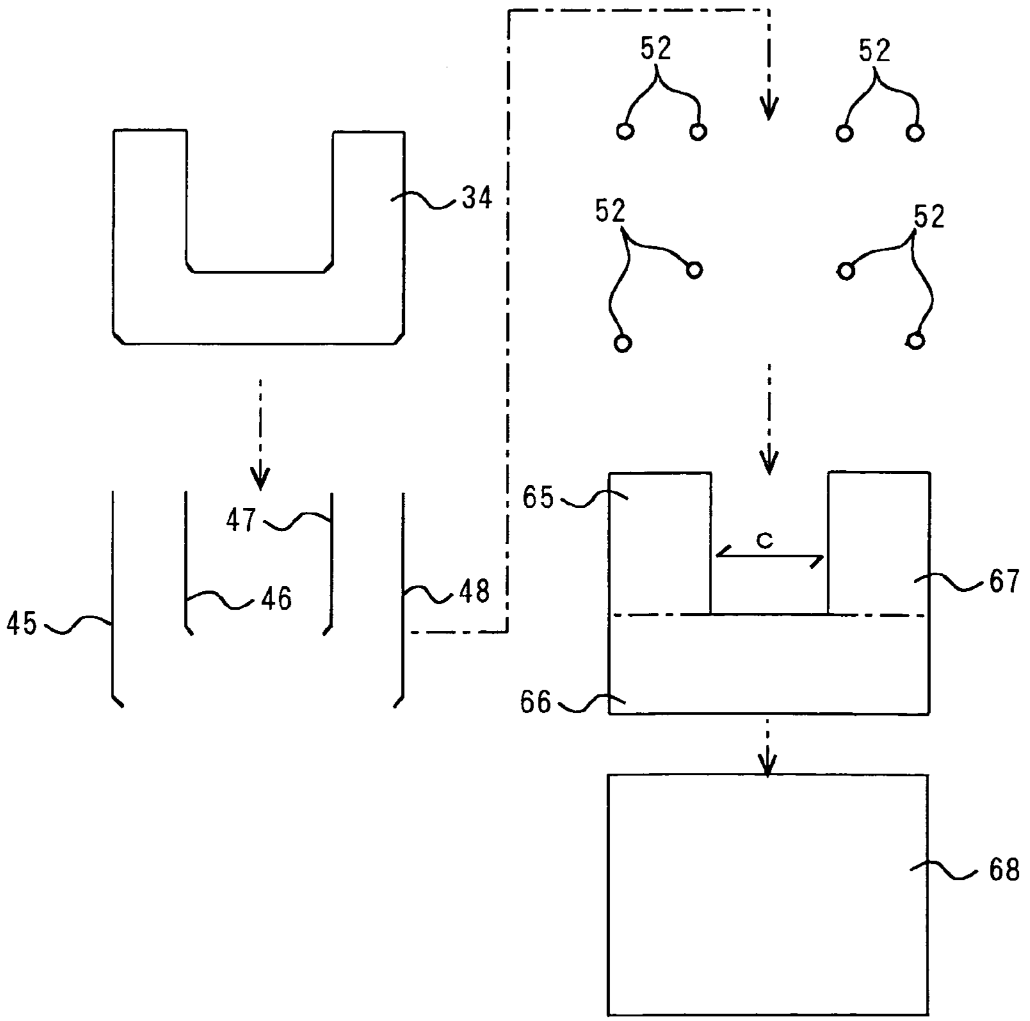
FIG. 9 is a diagram illustrating an example of extraction and reshaping of blocks.

FIG. 9 illustrates a processing given to an area having a concave. 34 denotes an area having image data, and boundary lists 45 through 48 are extracted from it. When the processing of FIG. 6 is executed for the boundary lists 45 through 48, vertices 52 will be extracted. When a polygon connecting these vertices is obtained, blocks 65 through 67 will be extracted. To prevent formation of an unnatural polygon, for example, a polygon wherein some vertices of a large number of vertices are connected catercorner, a polygon is obtained by giving priority to directions that are parallel to the main scanning direction or the auxiliary scanning direction and priority to connecting a combination of vertices of different attributes. For each vertex, an attribute whether it indicates change from a ground color part to an area having print data or change from an area having print data to a ground color part is stored. And vertices having different attributes are connected. Then three blocks 65 through 67 of FIG. 9 are obtained. Next, a space c between the block 65 and the block 67 is checked whether it is not less than the designated value. In this case, as the space c is less than the designated value, the printing time will be shorter when the blocks are united. Hence three blocks 65 through 67 are united to make a larger rectangular block 68.

In this way, blocks having print data can be extracted from a preview image. The extracted blocks are rectangular, and inside each block the nozzle head is driven at low speed to print, and in an area between blocks the nozzle head is shifted, for example, at high speed. As a result, printing can be done at higher speed.

Figure 10:
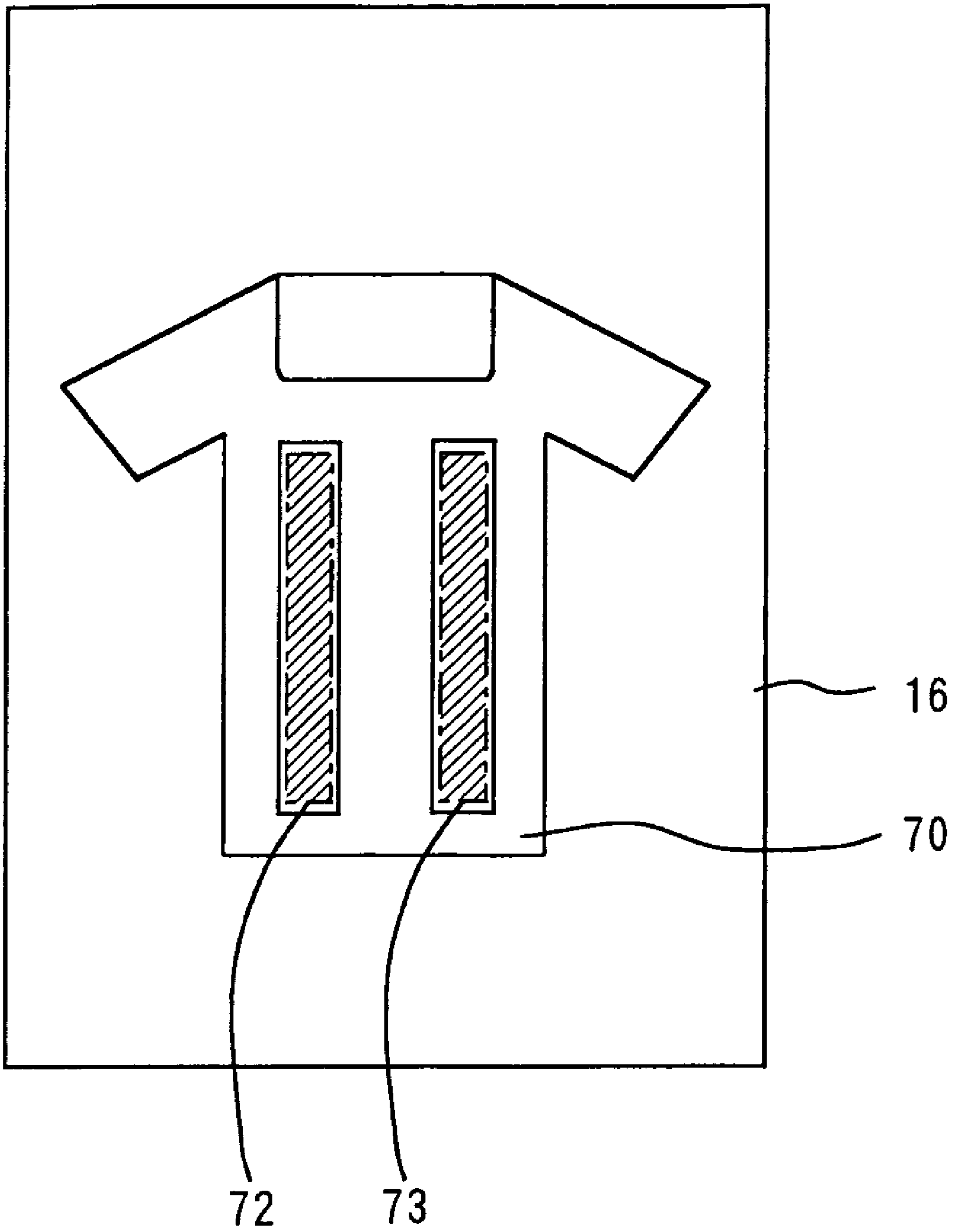
FIG. 10 is a diagram schematically illustrating blocks to be printed on a garment.

FIG. 10 illustrates an example wherein two blocks 72, 73 are extracted to be printed on a garment 70. Shaded areas in the diagram are areas within polygons connecting vertices. These shaded areas are inside the blocks 72, 73, respectively, and the margins outside these shaded areas are intended to ease driving of the nozzle head. In this case, the nozzle head prints the block 72 on the left side, then prints the block 73 on the right side. As for other areas, the nozzle head merely passes. As a result, the printing time can be reduced to ½ through one over several of that of the conventional method.

The invention claimed is:

1. A printing system comprising a table for placing a medium to be printed thereon, and a carriage for shifting a nozzle head for ink jet printing, in relation to said table, in both an operation of the nozzle head in a main scanning direction (X direction) and an operation of the carriage in the auxiliary direction (Y direction) which are independent of each other within a printable range on said table, said printing system further comprising:

a block extracting means for extracting areas to be printed from print data inputted and for decomposing the print data into blocks narrower than the printable range in both the main scanning direction and the auxiliary scanning direction; and a control means for making the carriage and the nozzle head scan only within the blocks decomoposed and print the print data within the blocks extracted.

2. A printing system according to claim 1, characterized in that said block extracting means comprises:

a boundary extracting means for extracting boundaries of the areas to be printed from the print data inputted at least in either the main scanning direction or the auxiliary scanning direction; and a setting means for setting the blocks so that the blocks include the extracted boundaries.

3. A printing system according to claim 2, characterized in that said setting means extracts start points and end points of the extracted boundaries, and points changing in position in a direction differing from directions of the boundaries by a predetermined distance or over between the start points and the end points, to set the blocks including the respective extracted points.

4. A printing system according to claim 1, characterized in that each of said blocks is set as a rectangle sides parallel to the main scanning direction or the auxiliary scanning direction.

5. A printing system according to claim 1, characterized in that the block extracting means is inputted with a preview image of print data to extract blocks from the preview image.

6. A printing method using a printer comprising a table for placing a medium to be printed thereon and a carriage for shifting a nozzle head for ink jet printing, in relation to said table, in both an operation of the nozzle head in a main scanning direction (X direction) and an operation of the carriage in the auxiliary direction (Y direction) which are independent of each other within a printable range, said printing method further comprising:

a step for extracting areas to be printed from print data inputted and for decomposing the print data into blocks narrower than the printable range in both the main scanning direction and the auxiliary scanning direction; and a step for making the carriage and the nozzle head scan only within the blocks decomposed and print the print data within the blocks extracted.

* * * * *